April 17, 1962　　　M. E. WEBSTER　　　3,029,807
PORTABLE L.P. GAS TORCH
Filed Oct. 28, 1959　　　　　　　　　　2 Sheets-Sheet 2
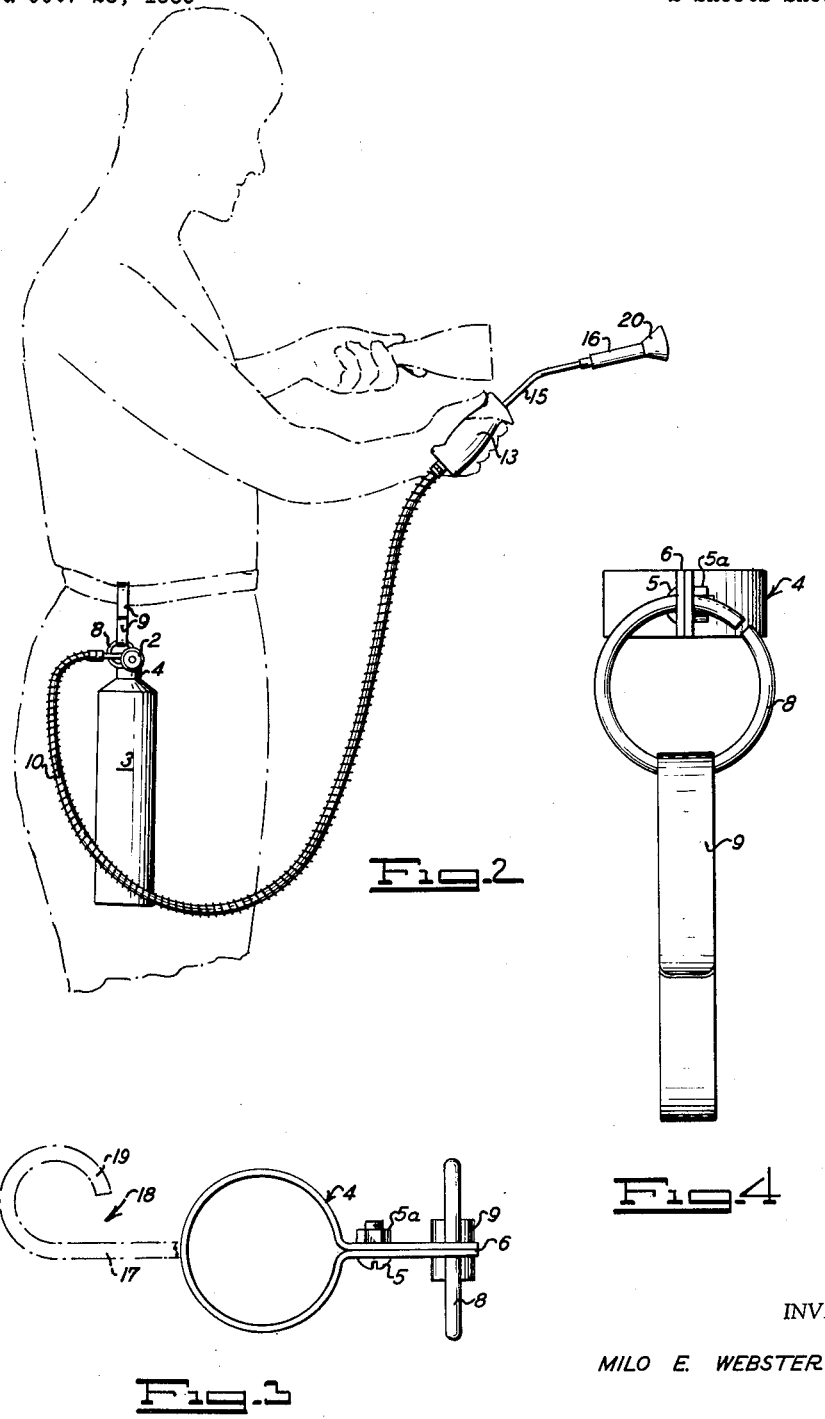
INVENTOR
MILO E. WEBSTER
BY Burgess Dinklage Sprung
ATTORNEYS

United States Patent Office 3,029,807
Patented Apr. 17, 1962

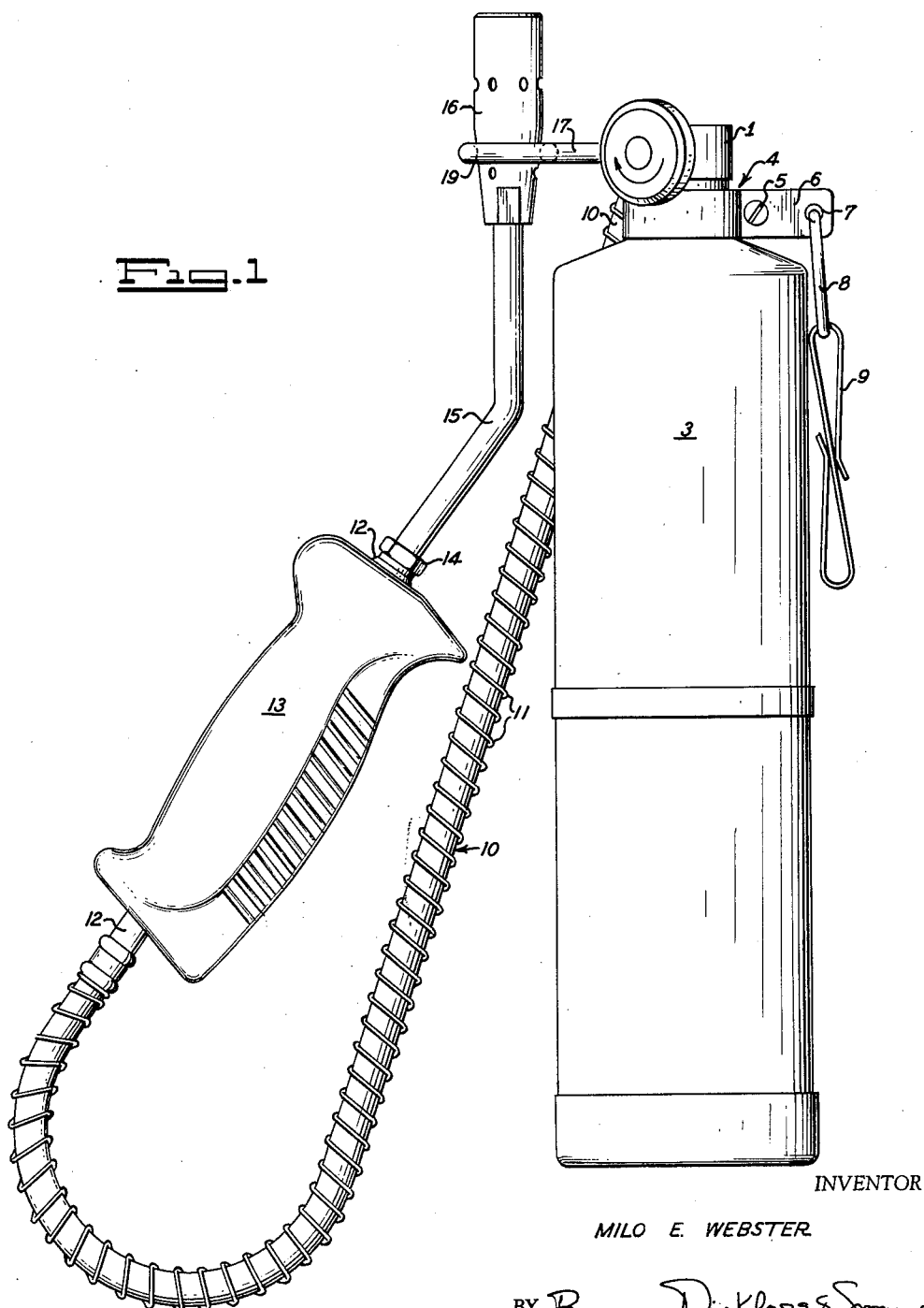

3,029,807
PORTABLE L.P. GAS TORCH
Milo E. Webster, Rochester, N.Y., assignor to Otto Bernz Co., Inc., Rochester, N.Y., a corporation
Filed Oct. 28, 1959, Ser. No. 849,233
1 Claim. (Cl. 126—271.2)

This invention relates to a novel portable L.P. (liquefied petroleum) gas torch.

Blow torches used for soldering, sweating, burning, and other heating purposes and which utilize a liquefied petroleum gas, such as propane, for fuel have been known and used for a considerable period of time. Generally, a relatively large container or cylinder was used to hold the fuel. Thus, for example, 25, 50, or 100 lb. propane tanks were used, and the torch burner head mounted on a handle was connected to these containers or cylinders by means of a flexible hose. The valve for shutting off the fuel supply and adjusting the same was usually positioned at the torch burner head or at the cylinder.

While these larger containers or cylinders for L.P. fuel might be considered portable in that they could be transported from place-to-place, the same could not be considered truly portable in that during the actual use of the torch at a given location, the container or cylinder would remain stationary. For example, if a torch of this construction were used for a paint burning operation, the tank was positioned, as for example, on the ground adjacent the area where the paint was to be burnt. The torch was then operated over the area which the length of its hose would allow and when the paint had been burned off this area, operation was interrupted, the cylinder lifted and moved to another spot and the operation was repeated. The container or cylinder of fuel was, therefore, not continuously transported by the operator during operation and would not continuously travel with the operator in order to allow greater flexibility.

The above-described torches, utilizing the relatively large containers or cylinders of L.P. fuel, were generally only used by the professional artisan, such as plumbers, painters, or the like, and were not generally available to the ordinary amateur handy man or "do-it-yourself" home owner, repairer, or mechanic. The torches utilizing these large L.P. cylinders were generally too expensive to warrant purchase by the ordinary amateur or home owner and the problem of refilling the tank upon exhaustion of the gas supply presented difficulties.

In more recent years, more truly portable L.P. gas torches have become available and are widely marketed. These torches consist of a truly small, readily manipulated, light-weight L.P. gas cylinder on which the torch burner head is directly mounted so that the cylinder itself acts as the torch handle. Most generally, the torch head is mounted on a tap connection, provided with a shut off and adjustment valve, which may be removably connected to a portable throw-away L.P. gas cylinder, such as a liquefied propane gas cylinder.

The advent and marketing of these latter mentioned L.P. gas torches made the same readily available and widely used by the amateur and ordinary home owner. The torches were inexpensive and the cylinders, after the same became exhausted, were merely thrown away and replaced by new, inexpensive cylinders. Furthermore, these cylinders were relatively versatile fitting a wide number of gas burning appliances including lanterns, stoves, fire pots, and the like.

For various operations, however, these latter-mentioned torches are not completely satisfactory. Thus, for prolonged operation, as for example the burning off of paint over a large area, the manipulation of the torch head directly connected on the cylinder may become wearisome and tiring. This, additionally, is generally true of any operation involving prolonged torch use. Furthermore, for certain other operations, the direct attachment of the cylinder on the torch burner head, as the handle, renders the manipulation rather clumsy and interferes with the dexterity which might be achieved if the cylinder did not have to also be manipulated with the torch burner head.

One object of this invention is a novel L.P. gas torch construction which combines the advantages of both the above-mentioned types of torches while eliminating the disadvantages of each. This and still further objects will become apparent from the following description read in conjunction with the drawings in which:

FIG. 1 is a side elevation of an embodiment of an L.P. torch in accordance with the invention;

FIG. 2 is a perspective view showing the torch of FIG. 1 in use;

FIG. 3 is a plan view showing the constructional details of the bracket of the torch of FIG. 1 and FIG. 4 is a front elevation corresponding to FIG. 3.

The portable L.P. gas torch in accordance with the invention comprises a light-weight portable container for L.P. gas, as for example the conventional readily available, truly light-weight, portable, throw-away, liquefied propane gas cylinder. The torch has a torch burner head of conventional construction and a handle for holding and manipulating this torch burner head. A flexible conduit connects the burner head and the container and valve means control the flow of the fuel through the conduit from the container to the torch head. Means are provided for suspending the cylinder from an operator and the flexible conduit is of sufficient length to allow free, manipulation of the torch burner head when the container is so suspended. Most preferably, the torch has a conventional tap connection for a portable throw-away L.P. gas cylinder. This tap connection contains the shut off and gas flow adjustment valve with the flexible conduit being connected thereto.

The means for suspending the cylinder from an operator is preferably in the form of a belt clip connected to the tap connection so that the tap connection and a cylinder screwed therein may be very easily clipped on to and suspended from the belt of an operator. Additionally, the torch preferably has a bracket for removably holding the burner head and handle along side the container when the torch is not in use thus allowing the operator to free his hands. This bracket is preferably in the form of a loop bracket for the torch head connected to the cap connection.

While the belt clip constitutes a highly preferred means for suspending the cylinder from an operator, other means may be used in its stead as for example a shoulder strap or any other clip means for suspending the cylinder from an operator or from the clothing of the operator.

Referring to the embodiment shown in the drawings, 1 designates the tap connection for a portable throw-away L.P. gas cylinder. This tap connection has the conventional and well known construction, as for example described in U.S. Patent 2,793,504 of May 28, 1957, and may, for example be provided with a shut off and flame adjustment valve controlled by the hand screw 2. The tap connection generally has a female threaded portion into which the male threaded bung of the throw-away cylinder is screwed. Additionally, the same has a central, hollow stem which may be provided with a gas-flow regulating valve as described in U.S. Patent 2,793,504. This stem extends into a discharge opening extending through the bung of the cylinder and depresses a closure valve in the cylinder, as for example an ordinary tire core valve. A resilient gasket is provided in this discharge opening which comes into sealing engagement with the stem and additionally the seal is effected by screwing the tap tight down against the bung so that a gasket, as for example, an angular gasket surrounding the stem, is pressed in gas-tight engagement with the top of the bung. As shown, the portable throw-away L.P. gas cylinder 3 is already screwed in position on the tap connection. This cylinder may, for example, be of the well known commercially available type sold under the trade name Bernz-O-Matic.

Surrounding the cylindrical portion of the base of the tap connection is the bracket clamp 4, the constructional details of which may additionally be noted in FIGS. 3 and 4. The bracket clamp 4, as may be seen, is held tightly in position around the cylindrical portion of the tap connection by means of the screw 5 and nut 5a. An extension 6 of the bracket clamp has a hole 7 through which is fitted the ring 8, having for example a construction identical to that of an ordinary slit-spring type key ring. Attached to the ring 8 is the leaf-spring type belt clamp 9.

Connected to the outlet of the tap connection 1 is the flexible hose 10. This flexible hose may be of the well known, conventional construction for propane hoses, and may, for example, be provided with metal spring sheath 11 in order to protect the same from abrasion and the like. The hose 10 is connected to the outlet of the tap connection in the conventional manner, as for example, by being screwed therein with a compression fitting, in the same manner for example, that the torch burner head is normally connected to this tap connection. Connected to the other end of the hose 10, as for example by means of this swaged gas-tight fitting shown, is the metal tube 12 of, for example, copper or brass. This metal tube 12 extends through the handle 13 which is made of any suitable material, preferably insulating material, such as plastic, rubber, or the like. The opposite end of the tube 12, coming out of the top of the handle, is provided with a female thread fitting into which the threaded bushing 14 is screwed which, in turn, secures the tube 15 of the torch head proper in place in the conventional manner as for example with a compression fitting. The torch burner head, including the tube 15, and burner proper 16, may have the conventional and well known construction and may, for example, have the construction described in my co-pending application Serial No. 819,369, filed June 10, 1959.

A support bracket 17 of circular metal stock is secured to the tap connection 1, as for example by having its end male threaded and screwed in a corresponding drilled and tapped hole in the tap connection. The support bracket is merely in the form of a bent hook as may be seen in FIG. 3. The opening 18 is of sufficient width to allow the passage of the tube 15, but the diameter of the bent end portion 19 is smaller than the outer diameter of the burner proper 16. The tube 15 may be slid through the opening 18 and the burner 16 lowered into the position shown in FIG. 1 so that the same will be supported in place.

In operation, the portable throw-away L.P. cylinder 3 is screwed in place on the tap connection with the valve, controlled by a hand screw 2, closed. The device is then suspended from the belt of an operator as shown in FIG. 2 by hooking the belt clip 9 over this belt. With the burner suspended in place as shown in FIG. 1, the hands of the operator are completely free. When the operator wishes to use the device, he merely grasps the handle 13 and lifts the handle and torch burner head free from the bracket and turns the hand screw 2 to start the gas flow. He then lights the burner in the conventional manner and may freely operate the burner in the manner shown in FIG. 2 so that the device achieves true portability and yet may be very easily manipulated for long periods of time without becoming arm-weary. As shown in FIG. 2, the burner 16 is provided with the conventional fish-tail like frame spreader 20 for paint burning.

While the invention has been described in connection with the specific embodiments shown, various changes and modifications will become apparent to the skilled artisan which fall within the spirit of the invention. The invention is, therefore, only intended to be limited by the appended claim or their equivalents wherein I have attempted to claim all inherent novelty.

I claim:

A portable liquefied petroleum gas torch comprising a tap connection for a portable throw-away liquefied petroleum gas cylinder, a rigid gas flow tube bent at an obtuse angle, a torch burner head connected at the end of said rigid gas flow tube, a handle for holding and manipulating said torch burner head surrounding the other end of said rigid gas flow tube, a flexible conduit flow connecting said tap connection and tube, valve means in said tap connection for controlling the flow of fluid therethrough, a belt clip connected to said tap connection for suspending the same and a cylinder attached thereto from an operator, said flexible conduit being of sufficient length to allow free manipulation of said torch burner head when said tap connection is so suspended and a support bracket extending from said tap connection for removably holding said burner head along side of said tap connection, said support bracket having an interrupted holding ring for the burner head, said ring having an inner diameter smaller than the outer diameter of the torch burner head and larger than the outer diameter of said gas flow tube, the interrupted portion of said ring being dimensioned to allow the passage of said gas flow tube therethrough.

References Cited in the file of this patent

UNITED STATES PATENTS

| 887,743 | Storm | May 12, 1908 |
| 2,888,979 | Lindgren | June 2, 1959 |
| 2,962,020 | Hunter et al. | Nov. 29, 1960 |

FOREIGN PATENTS

| 384,755 | France | Feb. 14, 1908 |